United States Patent [19]

Ueda et al.

[11] 4,319,211
[45] Mar. 9, 1982

[54] ELECTROMAGNETICALLY DRIVEN DEVICE

[75] Inventors: Hiroshi Ueda, Nara; Shigeru Oyokota, Sakai, both of Japan

[73] Assignee: Minolta Camera Kabushiki Kaisha, Azuchi, Japan

[21] Appl. No.: 91,811

[22] Filed: Nov. 6, 1979

[30] Foreign Application Priority Data

Nov. 10, 1978 [JP] Japan ................................ 53-139153

[51] Int. Cl.³ .............................................. H01F 7/08
[52] U.S. Cl. .................................... 335/229; 335/230; 335/261
[58] Field of Search .................. 335/80, 81, 229, 230, 335/234, 261, 279; 354/234

[56] References Cited

U.S. PATENT DOCUMENTS

| 3,203,447 | 8/1965 | Bremmer et al. | 335/229 X |
| 3,504,320 | 3/1970 | Engdahl et al. | 335/229 X |
| 3,636,850 | 1/1972 | Kikuchi et al. | 354/234 X |
| 4,121,235 | 10/1978 | Fujita et al. | 354/234 |
| 4,171,897 | 10/1979 | Fujita et al. | 354/234 |

Primary Examiner—George Harris
Attorney, Agent, or Firm—Wenderoth, Lind & Ponack

[57] ABSTRACT

An electromagnetically driven device has a bobbin made of non-magnetic material and has an opening formed in its axial direction. A coil is wound on the bobbin for establishing a magnetic field inside and around the bobbin when electric current is supplied to the coil. A plunger made of magnetic material is inserted into the opening for movement in its axial direction. A magnet is attached to one end of the plunger for increasing the driving force of the plunger when electric current is supplied to the coil.

13 Claims, 15 Drawing Figures

Fig. 10
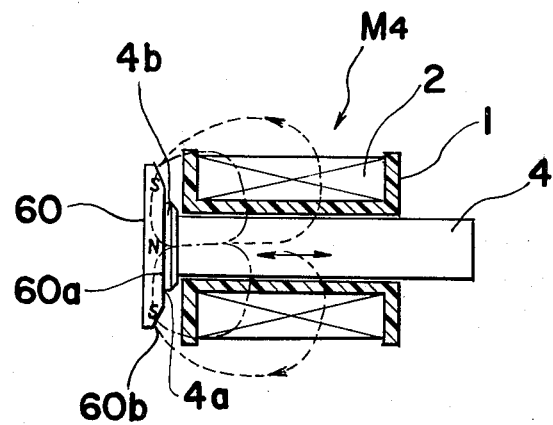
Fig. 11(a)  Fig. 11(b)
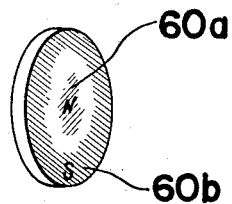 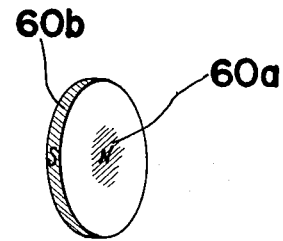
Fig. 11(c)  Fig. 11(d)
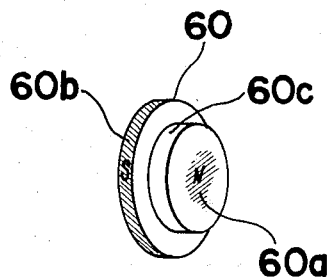 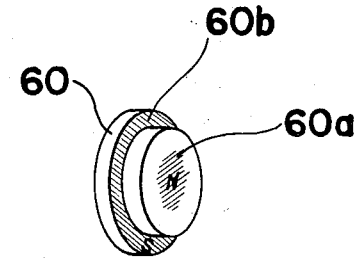

ELECTROMAGNETICALLY DRIVEN DEVICE

BACKGROUND OF THE INVENTION

The present invention relates to an electromagnetically driven device and, more particularly, to an improvement of the device.

A typical electromagnetically driven device is a solenoid device having a coil and a plunger. The coil produces a magnetic force when current flows through the coil. Preferably, the coil is provided with an armature which can be magnetized when the coil is energized to produce a magnetic force. The plunger includes a rod member and a segment made of magnetic material rigidly attached to one end of the rod. The rod member is movably inserted into the coil in the axial direction of the coil while the segment is positioned adjacent to the armature with a predetermined gap therebetween. When the current flows through the coil, the armature is magnetized for generating a magnetic force which attracts the segment. Thus, the segment is moved towards the armature together with the plunger rod. The movement of the rod acts on a mechanical device provided adjacent to the rod member.

In the solenoid device described above, the magnetic force generated from the armature is exponentially reduced from the outside face of the armature towards the axial direction of the coil. Accordingly, when the gap between the armature and the segment is considerably large, the magnetized armature attracts the segment with a weak attractive force. Therefore, the solenoid device described above may be applicable only to a mechanical device which requires a short distance of movement of the plunger. However, in the case where the plunger is required to move a considerably long distance with quick and stable motion, it is necessary to strengthen the attractive force between the coil and the plunger. For this purpose, many improvements have been made.

One example is disclosed in U.S. Pat. No. 4,060,313 to Kondo issued on Nov. 29, 1977. Kondo discloses a coil and a blade inserted in the coil shiftably in an axial direction of the coil. A magnet sheet is mounted in the blade inside the coil so that the magnetic force developed in the coil is exerted on the magnet sheet to move it together with the blade. In this example, the stroke of the magnet is determined by the axial length of both the magnet and the coil, thus the size of the device becomes large as the stroke of the blade becomes longer. Furthermore, the magnet can be disadvantageously trapped at the center of the coil. If the magnet is made long for increasing the length of stroke, the magnetic resistance is increased. Then, it requires an increase in current in the coil for increasing the magnetic force.

A similar electromagnetic driven device is disclosed in U.S. Pat. No. 4,072,965, to Kondo issued on Feb. 7, 1978.

Another electromagnetically driven device is a linear motor having an array of magnets aligned and fixed on a base and a movable member positioned above and close to the magnet array with a predetermined gap. The movable member is provided with at least one coil for producing a magnetic force. The produced magnetic force attracts the magnet array and advances the movable member. This device requires the supply of electricity to the coil in the movable member. Therefore, the wiring or connection between the power source and the coil is complicated.

SUMMARY OF THE INVENTION

Accordingly, it is a primary object of the present invention to provide an improved electromagnetically driven device which can move the plunger with a strong driving force.

It is another object of the present invention to provide electromagnetically driven device of the above described type which is simple in construction and can be readily manufactured at a low cost.

In accordance with a preferred embodiment of the invention, an electromagnetically driven device comprises a bobbin made of non-magnetic material and having an opening formed in its axial direction and a coil wound on the bobbin for establishing a magnetic field inside and around the bobbin when the coil is supplied with an electric current. The device further comprises a plunger made of magnetic material and inserted into the opening of the bobbin for movement in its axial direction and magnet means having a first surface polarized to one of north and south poles and a second surface polarized to the other of north and south poles. The first surface is attached to one end of the plunger while the second surface is positioned close to the coil. Accordingly, a large number of magnetic flux lines produced between the first and second surfaces are interlinked with the coil along its entire length.

BRIEF DESCRIPTION OF THE DRAWINGS

The foregoing and other objects, features and advantages of the invention will be apparent from the following description of the invention with reference to the accompanying drawings in which:

FIG. 10 is a view similar to FIG. 2, showing a modification of a permanent magnet; and FIGS. 11(a) to 11(d) are perspective views of permanent magnets which are attached to a plunger.

DETAILED DESCRIPTION OF THE INVENTION

Figure 1:
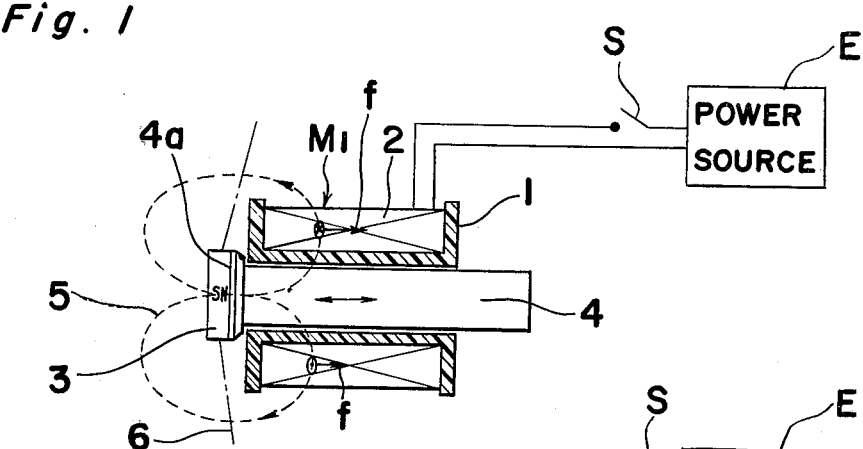
FIGS. 1 to 3 are schematic drawings showing the principle of the present invention.

In the following description of the invention like parts are designated by like reference numerals throughout the accompanying drawings.

Figure 2:
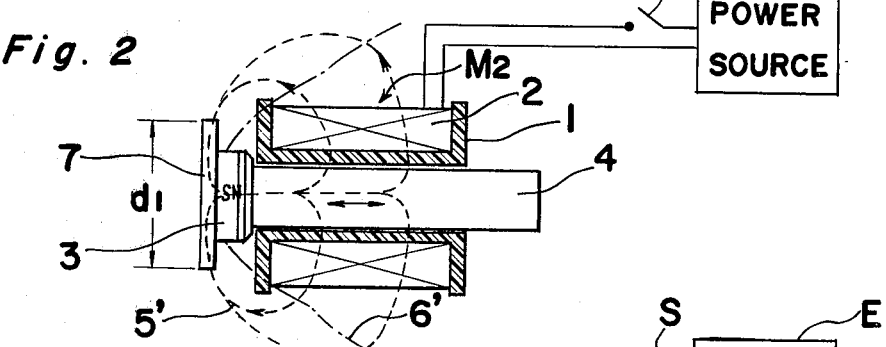
Figure 3:
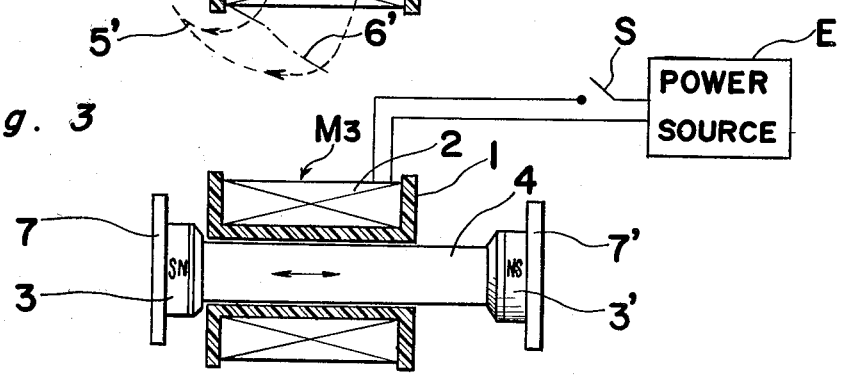

FIGS. 1 to 3 are schematic drawings showing the principle of the present invention. In FIG. 1, an electromagnetically driven device M1 includes a bobbin 1 made of insulating and non-magnetic material and a coil 2 densely wound on the bobbin 1. The bobbin 1 is tightly attached to a base (not shown) while the coil 2 is connected to a source of electric power E through a suitable switch S. When the switch S is turned on, current flows through the coil 2 in a direction indicated by the symbols ⊙ and ⊗ so that the north pole of the coil, hereinafter referred to as an apparent north pole, appears at the left-hand side of the coil 2. The device M1 further includes a plunger 4 made of magnetic material and inserted through the bobbin 1 for movement in its axial direction. A permanent magnet 3 is attached to one end face 4a of the plunger 4 with its north pole facing the plunger 4. The magnetic flux is produced from the permanent magnet 3 as shown by a dotted line.

When the switch S is turned on, the magnetic field established by the permanent magnet 3 exerts a force f in the right-hand direction to the wire carrying current in the above described direction. This force f can be understood from Fleming's left-hand rule. However, since the bobbin 1 carrying the coil 2 is rigidly supported on the base, the force f reacts on the permanent magnet 3 and also on the plunger 4 slidingly inserted in the bobbin 1. Accordingly, the plunger 4 carrying the permanent magnet 3 moves in the left-hand direction from an inserted position as shown in FIG. 1 towards a projecting position. This is because of the repulsion between the north pole of the permanent magnet 3 and the apparent north pole generated in the left-hand end portion of the coil 2 during the current flow through the coil 2.

Since the permanent magnet 3 shown in FIG. 1 is not provided with any segment or armature for intensifying the density of the magnetic flux from the magnet 3, its permeance factor is very low and, thus the number of flux lines produced from it is small. Furthermore, the neutral region of the magnetic field established by the permanent magnet 3 extends outward from the permanent magnet 3, as shown by a chain line 6. The slight inclination of the chain line 6 towards right-hand direction is caused by the presence of the plunger 4 which is made of magnetic material. In the position shown in FIG. 1, the magnetic flux produced from the permanent magnet 3 is densely distributed in the area close to the permanent magnet 3. Since the current which cuts the magnetic flux repulses the permanent magnet 3, only the windings of the coil 2 positioned in a region where the magnetic flux is densely distributed, that is, in a region close to the permanent magnet 3 mainly repulses the permanent magnet 3 when the coil 2 is energized. To repulse the permanent magnet 3 effectively by the entire windings of the coil 2, it is preferable to distribute the magnetic flux from the permanent magnet 3 all over the coil 2. For this purpose, another electromagnetically driven device M2 is shown in FIG. 2.

Referring to FIG. 2, the electromagnetically driven device M2 has the same structure as that of the electromagnetically driven device M1 except that the device M2 further includes a plate segment 7 made of magnetic material and rigidly bonded on the outer surface of the permanent magnet 3. The size of the plate segment 7 measured perpendicularly to the axial direction of the plunger 4 is larger than that of the permanent magnet 3. For example, when the permanent magnet 3 and the segment 7 are prepared in a disk shape, the diameter of the segment 7 is larger than that of the magnet 3.

In the arrangement shown in FIG. 2, since the south pole of the permanent magnet 3 is located adjacent the segment 7, the peripheral edge of the segment 7 is polarized to the south pole. Accordingly, the magnetic flux lines produced from the north pole of the permanent magnet 3 are further distributed in the right-hand direction for covering a larger area of the coil 2 while the density of the magnetic flux in the area close to the permanent magnet is reduced. The emitted magnetic flux lines are returned mainly back to the peripheral edge of the segment 7. The neutral region of the magnetic field established by the permanent magnet 3 is inclined further towards the coil 2, as shown by a chain line 6'. In addition, the external permeability of the permanent magnet 3 is greater than that shown in FIG. 1 while the number of magnetic flux lines from the magnet 3 is increased. Therefore, the driving force of the plunger 4 is greater while the length of stroke is longer than that shown in FIG. 1.

Figure 4:
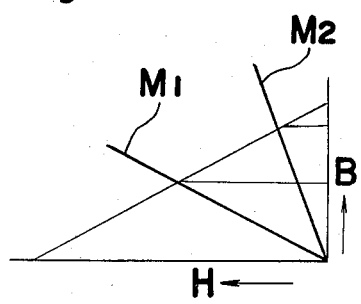
FIG. 4 is a graph showing the relationship between the magnetic flux density B and the magnetic field intensity H for the devices shown in FIGS. 1 and 2.

Referring to FIG. 4, a relationship between the magnetic flux density B and the magnetic field intensity H for both devices M1 and M2 is shown. As apparent from the graph, the magnetic flux density B increases more rapidly in the device M2 than in the device M1. The driving force of the plunger 4 in the device M2 is several times stronger than that in the device M1.

When the current flow through the coil 2 is reversed, the projecting plunger 4 can be pulled into the bobbin 1.

When the coil 2 is so energized as to shift the plunger 4 from the inserted position to the projecting position, the driving force is maximum when the plunger 4 starts to move and gradually reduces to a minimum value when it reaches the projecting position. On the other hand, when the coil 2 is so energized as to shift the plunger 4 from the projecting position to the inserted position, the driving force is minimum when the plunger 4 starts to move and is gradually increased to a maximum value when it reaches the inserted position. Although the driving force may vary between minimum and maximum values, the plunger 4 may response quickly even to the minimum driving force.

When the direction of dc current flowing through the coil 2 is alternately changed at a predetermined frequency by a suitable current control means, it is possible to allow the plunger 4 to move reciprocally in the bobbin 1.

Referring to FIG. 3, a further modification of the electromagnetically driven device is shown. An electromagnetically driven device M3 includes, in addition to those elements of device M2, another permanent magnet 3' attached on the other end of the plunger 4 and a segment 7' in a similar manner as described above with respect to magnet 3 and segment 7. The north pole of the permanent magnet 3' faces the end of the plunger 4. The electromagnetically driven device M3 is particularly suitable for producing a constant driving force to the plunger 4.

Figures 5A, 5B:
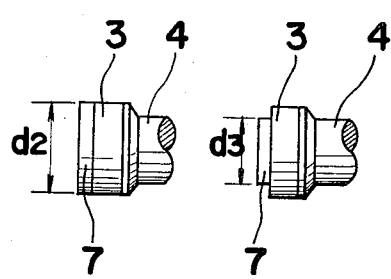
FIGS. 5(a) and 5(b) are fragmentary side views of a plunger showing different sizes of a segment attached to a permanent magnet.

Although it has been described that the segment 7 or 7' has larger diameter than that of the end face of the plunger 4, the diameter of the segment 7 or 7' may be equal to or smaller than the diameter of the end face of the plunger 4 as shown in FIGS. 5(a) and 5(b).

Figure 6:
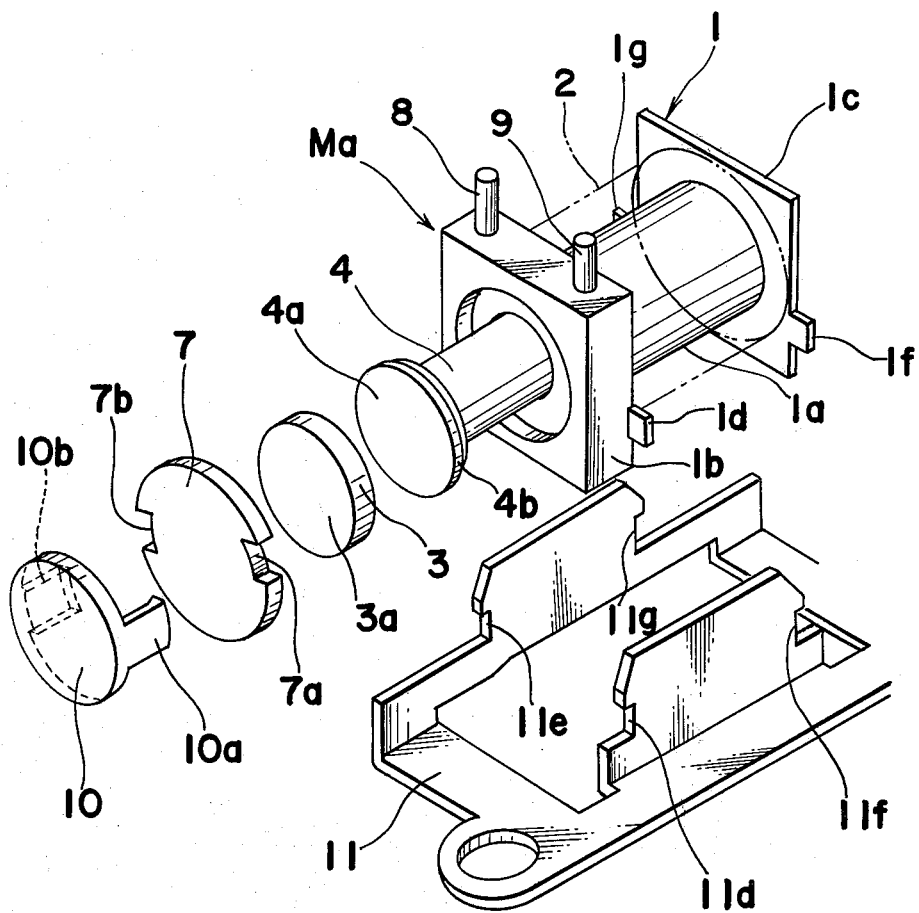
FIG. 6 is an exploded perspective view of one embodiment of an electromagnetically driven device according to the present invention.

Referring to FIG. 6, one embodiment of the electromagnetically driven device Ma is shown. The device Ma includes bobbin 1 made of insulating material. The bobbin 1 has a cylindrical body 1a with an opening formed in its axial direction, and a pair of support plates 1b and 1c provided at opposite ends of the body 1a.

Each of the plates 1b and 1c are formed with an opening for allowing the slidable insertion of plunger 4 into the cylindrical body 1a. The plate 1b is provided with projections 1d and 1e (not visible in FIG. 6) on the opposite edges thereof while the plate 1c is provided with projections 1f and 1g on the opposite edges. These projections 1d to 1g are rigidly inserted into recesses 11d, 11e, 11f and 11g, respectively, formed in a base 11 for holding the bobbin 1. The coil 2 is mounted on the body 1a of the bobbin 1 while the opposite ends of the coil 2 are connected to terminals 8 and 9 provided on the plate 1b. The device Ma further includes a plunger 4 made of magnetic material and having a head portion 4b having a diameter which is larger than that of its bar portion. The head portion 4b has a flat surface 4a for placing permanent magnet 3. A segment 7 is made of magnetic material and is placed on top of the permanent magnet 3. For securing the permanent magnet 3 and the segment 7, a cap member 10 having a pair of arms 10a and 10b is mounted on the segment 7. The intermediate portion of arms 10a and 10b are, respectively, inserted into recesses 7a and 7b formed in the segment 7 while the tip of the arms 10a and 10b are provided with pawls for holding the head portion 4b. The cap member 10 is made of a non-magnetic material such as a plastic so that only the segment 7 is magnetized by the polarity of permanent magnet 3 appearing on the surface 3a.

Since the plunger 4 responses quickly and moves fast in response to the driving force generated by the coil 2, the plunger 4 can be connected to a mechanism which requires a quick motion. From this viewpoint, the electromagnetically driven device can be used in association with a shutter mechanism employed in cameras.

Figure 7:
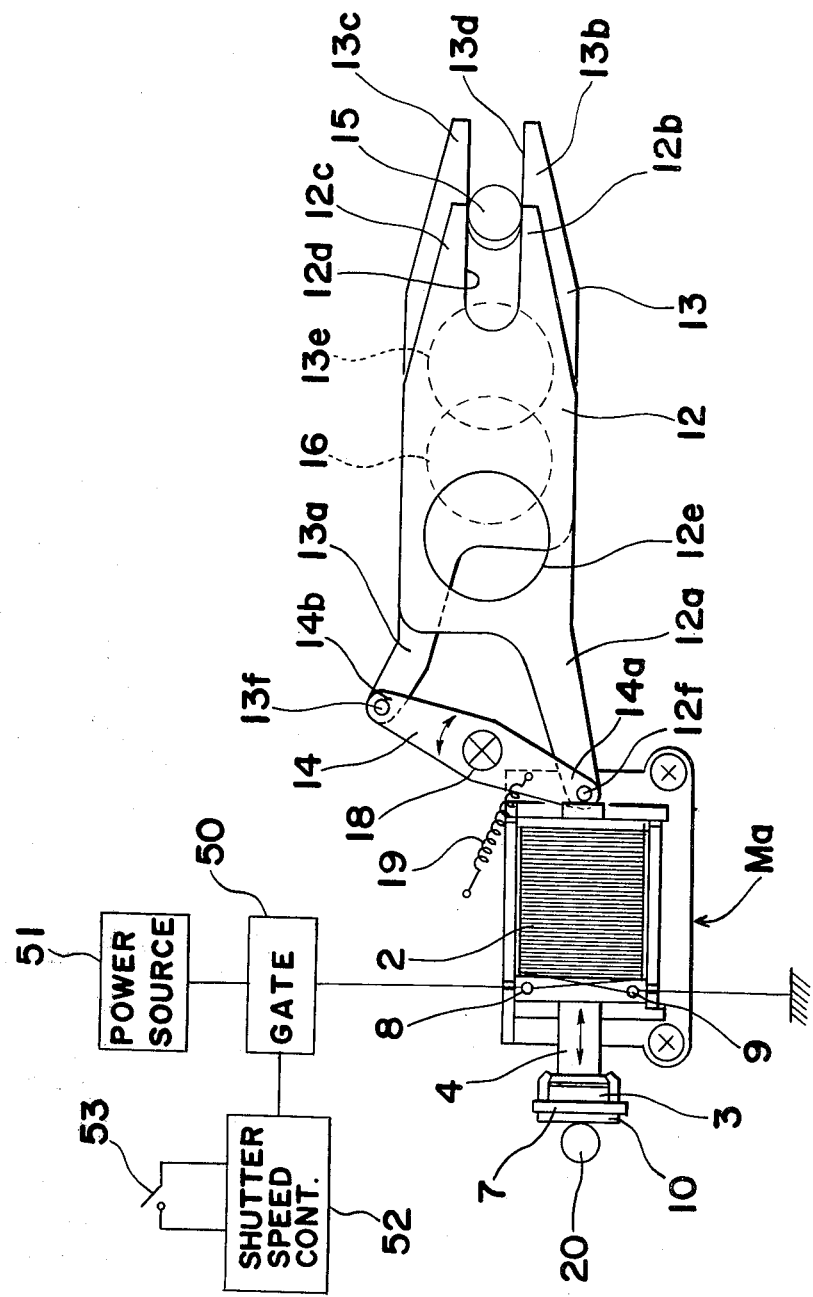
FIG. 7 is a front elevational view of a shutter mechanism employed with an electromagnetically driven device according to the present invention.

Referring to FIG. 7, the shutter mechanism includes first and second shutter blades 12 and 13 operatively carried by a camera housing (not shown) in a manner as will be described. Note that the camera housing has an aperture 16 which is positioned in alignment with the optical axis of an objective lens assembly (not shown) mounted on the camera housing in any known manner.

The first shutter blade 12 of elongated shape has an arm 12a extending outwardly from one end of the blade 12 and bifurcated arms 12b and 12c from the other end of the blade 12. The bifurcated arms 12b and 12c define a slot 12d for slidably receiving a pin 15 projecting from the camera housing. The first shutter blade 12 has an opening 12e which can be brought into an alignment with the aperture 16, i.e., to an operative position, when moved in the right-hand direction.

The second shutter blade 13 of elongated shape has an arm 13a extending outwardly from one end of the blade 13 and bifurcated arms 13b and 13c from the other short end of the blade 13 for forming a slot 13d slidably receiving the pin 15. An opening 13e is formed in the second shutter blade 13. When the blade 13 is moved in the left-hand direction, the opening 13e can be brought into an alignment with the aperture 16, i.e., to an operative position.

The shutter blades 12 and 13 are placed one behind the other and are operatively associated by a connecting lever 14 rotatably supported on the camera housing by a pin 18. One end portion 14a of the lever 14 is pivotally connected to the end portion of the arm 12a remote from the blade 12 by a suitable pin 12f while the other end portion 14b of the lever 14 is pivotally connected to the end portion of the arm 13a remote from the blade 13 by a suitable pin 13f. When the lever 14 is rotated in a counterclockwise direction, the shutter blades 12 and 13 are moved in the right-hand and left-hand directions towards the respective operative positions. On the other hand, when the lever 14 is rotated in a clockwise direction, the shutter blades 12 and 13 are moved to the left-hand and right-hand directions, respectively, towards the inoperative positions as shown in FIG. 7. In the inoperative positions of the blades 12 and 13, the aperture 16 is completely blocked by the blades 12 and 13.

The electromagnetically driven device Ma is provided in association with the shutter mechanism for effecting the rotation of the lever 14. According to the arrangement shown in FIG. 7, one end of the plunger 4 remote from its head portion 4b is pivotally connected to the end portion 14a of the lever 14. A coil spring 19 is connected between the camera housing and the lever 14 for biasing the lever 14 to rotate in the clockwise direction so that when the electricity is not supplied to the coil 2, the plunger 4 is shifted to the left-hand side to a position in which the cap member 10 is held in contact with a pin 20 mounted on the camera housing. When electricity is supplied to the coil 2, the attractive force between the coil 2 and the segment 7 carrying the permanent magnet 3 moves the plunger 4 to the right-hand direction against the biasing force of the spring 19 until the shutter blades 12 and 13 are brought to the operative position. The termination of the shutter blades 12 and 13 to the operative positions is determined by the engagement between the pin 15 and the end of the slot 12d where the bifurcated arms 12b and 12c extend. When the supply of electricity is cut off, the above mentioned attractive force disappears and the lever 14 is allowed to rotate in the clockwise direction by the biasing force of the spring 19. Accordingly, the shutter blades 12 and 13 are moved to their inoperative positions.

The electricity to the coil 2 is supplied from a dc power source 51 through a gate means 50. The gate means 50 is also connected to a shutter speed controller 52 provided with a switch 53 which is operatively associated with a shutter release button (not shown). The shutter speed controller 52 has a timer means (not shown) which can be automatically or manually set. When the switch 53 is closed, the shutter speed controller 52 opens the gate means 50 during the set time, and thus, the electricity is supplied to the coil 2 during the set time.

It is to be noted that the returning of the shutter blades 12 and 13 from the operative position to inoperative position can be effected by the supply of reverse current to the coil 2. When the reverse current is supplied to the coil 2, a repulsive force between the coil 2 and the segment 7 carrying the permanent magnet 3 is generated for moving the plunger 4 from right to left, i.e., for moving the blades from operative position to inoperative position. In this case, it is not always necessary to provide the spring 19.

Next, an embodiment in which the electromagnetically driven device is operatively associated with an automatic focusing device is described.

Figure 8:
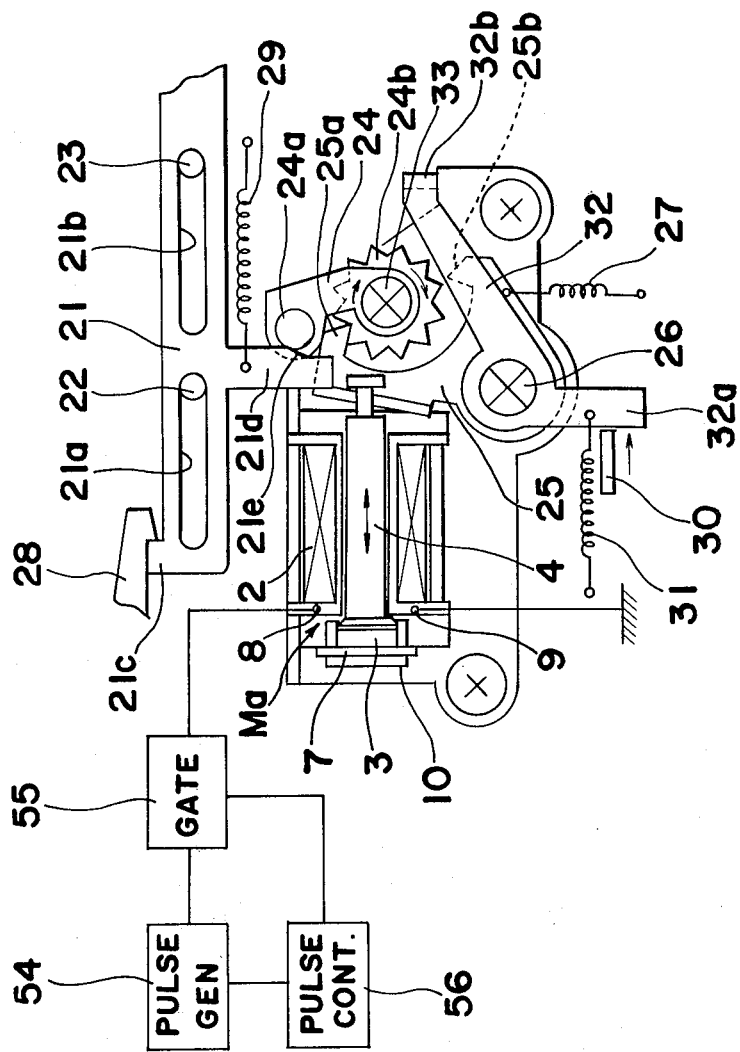
FIG. 8 is a side elevational view of an automatic focusing device employed with an electromagnetically driven device according to the present invention.

Referring to FIG. 8, the automatic focusing device comprises a movable plate 21 for rigidly carrying an objective lens (not shown) of the camera. The movable plate 21 has elongated slots 21a and 21b for receiving, respectively, pins 22 and 23 which are rigidly mounted on the camera housing. The plate 21 moves between a first position in which the pins 22 and 23 are held in contact with right-hand end of the respective slots 21a and 21b, as shown in FIG. 8, and a second position in which the pins 22 and 23 are held in contact with left-hand end of the respective slots 21a and 21b. The movable plate 21 is biased towards the second position by a spring 29 but is normally held in the first position by an engagement between a projection 21c extending upwardly from the left-hand end of the plate 21 and a hook 28 pivotally mounted on the camera housing. The movable plate 21 further has a leg portion 21d extending downwardly from the body portion of the plate 21.

A stop arm 24 is provided below the movable plate 21. The stop arm 24 has one end rotatably mounted on an axle 33 which is rigidly connected to the camera housing. The other end of the arm 24 remote from the axle 33 has a contact projection 24a which is adapted for a contact with the leg portion 21d. For facilitating the contact between the leg portion 21d and the projection 24a, the lower end of the projection 21d is formed with a recessed curve 21e which fittingly engages with the projection 24a when the arm 24 is rotated to some degree. Also rotatably mounted on the axle 33 is a ratchet wheel 24b which is connected to the arm 24 through a one-way clutch so that the arm 24 and the ratchet wheel 24b can rotate clockwise together about the axle 33 but the arm 24 freely rotates in the counter-clockwise direction. An anchor lever 25 having two pawls 25a and 25b is pivotally mounted on an axle 26 rigidly provided on the camera housing. The pawls 25a and 25b are positioned adjacent to the ratchet wheel 24b for effecting an intermittent circular motion of the ratchet wheel 24b when the anchor lever 25 is oscillated. It is to be noted that the anchor lever 25 and the ratchet wheel 24b form an anchor escapement. The anchor lever 25 is biased by a spring 27 to rotate in a clockwise direction so that normally, the pawl 25a is engaged in a tooth of the ratchet wheel 24b. A returning lever 32 having a short arm 32a and a long arm 32b is also pivotally mounted on the axle 26. Since the anchor lever 25 and the returning lever 32 are separately provided, they rotate independently of each other. The returning lever 32 is biased by a spring 31 to rotate clockwise while the short arm 32a is held in contact with a movable member 30 operatively associated with a film winding mechanism (not shown) provided for shifting one frame of the film after every shutter release.

The plunger 4 of the electromagnetically driven device is connected to the anchor lever 25 for effecting together with the spring 27 an oscillation of the anchor lever 25. In a position shown in FIG. 8, the pawl 25a is engaged in one of the teeth of the ratchet 24b. When one pulse signal is applied to the coil 2, the plunger 4 is instantaneously moved leftwards for turning the anchor lever 25 counterclockwise against the biasing force of the spring 27 for escaping the pawl 25a from the ratchet 24b, and pushing the pawl 25b against the slanted face of the ratchet tooth. The pushing force of the pawl 25b against the ratchet tooth causes a slight rotation of the ratchet wheel 24b in the counterclockwise direction. Immediately thereafter, that is, when the pulse is over, the biasing force of the spring 27 rotates the anchor lever 25 clockwise and thus returning the plunger 4 back to its initial position. The clockwise rotation of the anchor lever 25 causes an escapement of the pawl 25b from the wheel 24b and also an engagement of the pawl 25a again with the ratchet wheel 24b. Thus, during one oscillation of the anchor lever 25, the ratchet 24b and the stop arm 24 are rotated predetermined number of degrees in a clockwise direction about the axle 33. The predetermined number of degrees is determined by the pitch of every adjacent two of the teeth in the ratchet 24b. When another pulse is applied to the coil 2, the ratchet 24b and the stop arm 24 are further rotated about the axle 33 in a similar manner described above. In this manner, the number of pulses applied to the coil 2 determines the degree of rotation of the ratchet 24b and the stop arm 24 in the clockwise direction.

A pulse supplying circuit connected to the terminal 8 includes pulse generator 54, a gate 55 connected between the pulse generator 54 and the terminal 8 and a pulse controller 56 connected both to the pulse generator 54 and the gate 55. The pulse generated from the pulse generator 54 is applied to the gate 55 and further to the terminal 8. The opening and closure of the gate 55 is controlled by the pulse controller 56 which counts the number of pulses applied to the coil 2. A thorough operation of the automatic focusing device is described below.

When three pulses are applied to the coil 2, the plunger 4 makes three quick oscillations for rotating the ratchet 24b and the lever 24 in the clockwise direction three times, each time for a predetermined number of degrees. Thus, the stop lever 24, particularly, the projection 24a is separated a predetermined distance away from the leg portion 21d. Thereafter, the hook 28 disengages from the projection 21c for allowing the movable plate 21 to move towards the second position by the biasing force of the spring 29. Thus, the movable plate 21 moves until its leg portion 21d comes into contact with the projection 24a of the stop lever 24. Since the movable plate 21 carries the objective lens (not shown), the lens is also moved to a position where the lens focuses at a particular range of distance. According to one arrangement, the supply of three pulses may rotate the stop lever 24 to such a position that the projection 24a of the lever 24 stops the disengaged movable plate at its second position. In this arrangement, it is understood that the objective lens can be positioned at one of four different focused positions. The first focused position is obtained when the movable plate 21 is held in its initial or first position. This takes place when no pulse is applied to the coil 2. The second focused position is obtained when the movable plate 21 is stopped by the lever 24 which has been rotated the predetermined degree. This takes place when one pulse is applied to the coil 2. Likewise, the third and fourth focused positions are obtained when the movable plate 21 is stopped by the lever 24 which has been rotated two and three times a predetermined number of degrees, respectively. In the fourth focused position, the movable plate 21 can be held in its second position by the engagement between the pins 22 and 23 and right-hand end of the respective slots 21a and 21b. In this case, the stop lever 24 can be rotated outside the range for the contact with the leg portion 21d.

After the advance of objective lens to a desired position, the shutter is released for taking a photograph. Then, the film winding mechanism (not shown) is actuated for advancing one frame of the film. Since the winding mechanism is operatively associated with the movable member 30, the winding operation causes the movable member 30 to move in a right-hand direction. Accordingly, the returning lever 32 is rotated counterclockwise for rotating only the stop lever 24 back to its initial position, as shown in FIG. 8, by the contact between hooked end of the long arm 32b and the projection 24a of the lever 24. The return of the stop lever 24 to its initial position forcibly returns the advanced movable lever 21 back to its first position. Instead of lever 24, the movable lever 21 can be shifted back to its first position by another movable member (not shown) also operatively associated with the winding mechanism. Instead of the spring 27 the anchor lever 25 can be rotated clockwise by a left-hand direction movement of the plunger 4 effected by a negative going pulse supplied to the coil 2.

Figure 9:
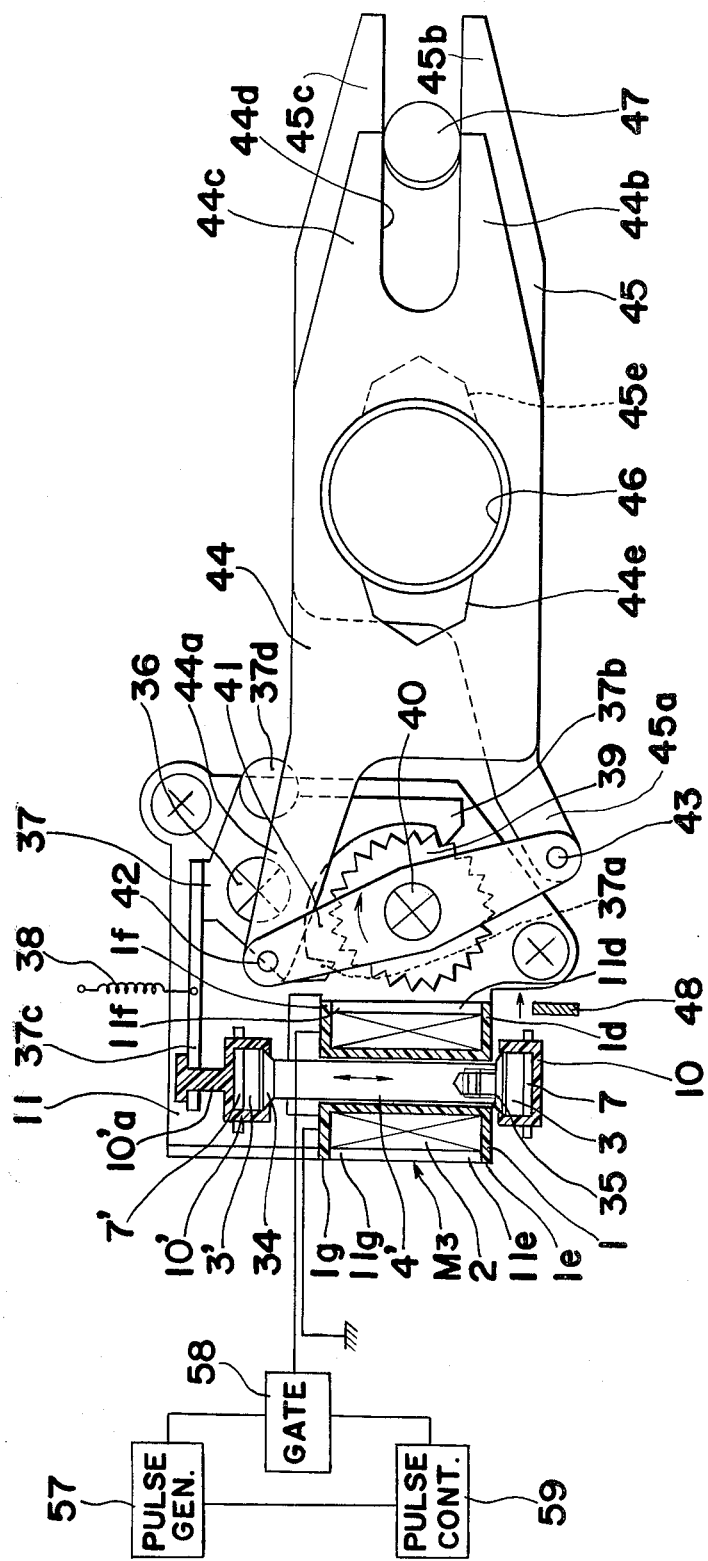
FIG. 9 is a front elevational view of an automatic aperture control device provided with an electromagnetically driven device according to the present invention.

A further embodiment is shown in FIG. 9. In this embodiment, the electromagnetically driven device is operatively associated with an automatic aperture control device.

Referring to FIG. 9, the automatic aperture control device comprises first and second aperture blades 44 and 45 operatively provided in the camera housing which has an opening 46 positioned in alignment with the optical axis of the objective lens assembly (not shown).

The first aperture blade 44 of elongated shape has an arm 44a extending outwardly from its one end and bifurcated arms 44b and 44c from the other end of the blade 12. The bifurcated arms 44b and 44c define a slot 44d for slidably receiving a pin 47 projecting from the camera housing. The first aperture blade 44 has an opening 44e which is normally held in alignment with the opening 46.

Similarly, the second aperture blade 45 of elongated shape has an arm 45a extending outwardly from its one end and bifurcated arms 45b and 45c from its other end for slidably receiving the pin 15. The second aperture blade 45 has an opening 45e which is normally held in alignment with the opening 46.

From the position shown in FIG. 9, the first aperture blade 44 is arranged to move in the right-hand direction while the second aperture blade 45 is arranged to move in the left-hand direction. When these movements of the aperture blades 44 and 45 are simultaneously effected, an aperture defined by the two openings 44e and 45e becomes smaller to control the size of optical path for the objective lens assembly. The simultaneous movement of the blades 44 and 45 is effected by a lever 41 having opposed ends pivotally connected to respective ends of the arms 44a and 45a, while the center portion of the lever 45 is rotatably mounted on an axle 40 rigidly extending from the camera housing. When the lever 41 rotates clockwise, the blade 44 is shifted to right while the blade 45 is shifted to left. A ratchet wheel 39 is rigidly connected to the lever 41 and is rotatably mounted on the axle 40. An anchor lever 37 having two pawls 37a and 37b is pivotally mounted on an axle 36 rigidly provided on the camera housing. The pawls 37a and 37b are positioned adjacent to the ratchet wheel 39 for effecting an intermittent circular motion of the ratchet wheel 39 when the lever 37 is oscillated. It is to be noted that the anchor lever 37 and the ratchet wheel 39 form an anchor escapement. The lever 37 has an arm 37c with its free end being supported by a projection 10a' integrally extending from a cap member 10'.

In the arrangement shown in FIG. 9, the electromagnetically driven device M3 has a plunger 4' provided with two head portions 34 and 35 at its opposite ends. At least one head portion, for example head portion 35, is attached to the plunger 4' by means of screw connection. The permanent magnet 3 and the segment 7 are attached to the head portion 35 in the manner described above and are secured in position by the cap 10. Similarly, the permanent magnet 3' and the segment 7' are held onto the other head portion 35 by the cap 10'. It is needless to say that the bobbin 1 carrying the coil 2 is rigidly secured on the base 11 by the projections 1d to 1g of the bobbin 1 which are tightly held in respective recesses 11d to 11g formed in the upright plate portion of the base 11.

In FIG. 9, the arm 37c of the anchor lever 37 is biased upwardly by a spring 38 for normally holding the plunger 4 in a raised position and also for normally holding the anchor lever 37 in such a condition that the pawl 37b is engaged with the ratchet wheel 39. When one pulse signal is applied to the coil 2, the plunger 4' instantaneously moves downwards against the biasing force of the spring 38 for turning the anchor lever 37 counterclockwise to escape the pawl 37b from the ratchet 39, and to push the pawl 37a against the slanted face of the ratchet tooth. The pushing force of the pawl 37a against the ratchet tooth causes a slight rotation of the ratchet wheel 39 in the clockwise direction. Immediately thereafter, that is, when the pulse is over, the biasing force of the spring 38 returns the plunger 4' back to its initial position for turning the anchor lever 37 clockwise, thus escaping the pawl 37a from the wheel 39 and also engaging the pawl 37b with the ratchet wheel 39. Thus, during one oscillation of the anchor lever 37, the ratchet wheel 37 and the lever 41 are rotated clockwise a predetermined number of degrees about the axle 40 causing the blades 44 and 45 to move in the right and left-hand directions, respectively. When the blades 44 and 45 are thus moved in opposite directions, a part of opening 44e is covered by the blade 45 while a part of opening 45e is covered by the blade 44. Thus, the aperture defined by the openings 44e and 45e is narrowed.

When a train of pulses is supplied to the coil 2, the plunger 4' oscillates for further narrowing the aperture defined by the openings 44e and 45e. It is understood that the number of pulses applied to the coil 2 controls the degree of reduction in the aperture size.

The pulses are supplied to the coil 2 by a pulse supplying circuit which has the same structure as the circuit described above with reference to FIG. 8.

After the narrowing of the aperture to a desired size, the shutter is released. Then, the film winding mechanism (not shown) is actuated for advancing one frame of the film. Since the winding mechanism is operatively associated with a movable member 48, the winding operation causes the movable member 48 to move in a right-hand direction. Accordingly, the lever 41 is rotated counterclockwise for returning the blades 44 and 45 back to their initial position as shown in FIG. 9.

Since the arm 37c of the anchor lever 37 supports the plunger 4' and its accessories such as permanent magnet, the moment of the anchor lever 37 about the axle 36 tends to rotate the lever 37 counterclockwise. To prevent such an undesirable moment, a weight 37d is attached to the lever 37 for counterbalancing the moment and thus effecting a stable movement of the lever 37, regardless of the setting angle of the camera.

Instead of the spring 38, the anchor lever 37 can be rotated clockwise by a downward movement of the plunger 4' effected by the supply of a negative going pulse to the coil 2.

In order to increase the driving force of the plunger 4, it is necessary to increase the external permeability of the permanent magnet for increasing the number of magnetic flux lines and to distribute the magnetic flux from the permanent magnet mainly on the coil for increasing the number of magnetic flux lines that interlink with the coil. These requirements are met by the employment of segment 7 in the electromagnetically driven devices shown in FIGS. 2 and 3. A further arrangement of the electromagnetically driven device according to the present invention but without the employment of segment 7 is described below.

Referring to FIG. 10, an electromagnetically driven device M4 includes a disc-shaped permanent magnet 60 having a diameter larger than the diameter of the face 4a of the head portion 4b. The permanent magnet has a trapezoidal cross-section when taken along its diameter. The north pole of the permanent magnet 60 is located on its surface facing the plunger 4 while the south pole of the same is located on its slanted surface adjacent to the peripheral edge. According to this arrangement, the magnetic flux lines from the permanent magnet 60 are distributed in a similar manner described above in connection with FIG. 2.

Referring to FIGS. 11(a) to 11(d), there are shown modifications of the permanent magnet 60 having a diameter larger than that of the face 4a. It is to be noted that in each of the FIGS. 11(a) to 11(d), the shaded portion shows the area in which the permanent magnet 60 carries the north and south poles.

In FIG. 11(a), the permanent magnet 60 has a plain disc shape. Its north pole 60a is located at the center portion of one flat surface while its south pole 60b is located at the peripheral portion of the same flat surface.

In FIG. 11(b), the permanent magnet 60 has the same shape as that shown in FIG. 11(a) and has its north pole located at the center portion of one flat surface. Its south pole, however, is located at the peripheral surface of the disc.

In FIG. 11(c), the permanent magnet 60 has a reduced diameter porjection 60c integrally and coaxially attached to the magnet 60. Its north pole 60a is located on the flat surface of the reduced diameter projection 60c while the south pole is located on the perimeter of the larger disc.

In FIG. 11(d), the permanent magnet 60 has the same shape as that shown in FIG. 11(c) and has its north pole located at the center portion of one flat surface. Its south pole, however, is located at the peripheral flat surface on which the projection 60c is attached.

Also, it is to be noted that in each of the permanent magnet shown in FIGS. 11(a) to 11(d), the north and south poles can be reversed, depending on the required movement of the plunger 4 and the direction of current flow.

Although the present invention has been fully described by way of examples with reference to the accompanying drawings, it is to be noted that various changes and modifications are apparent to those skilled in the art. Therefore, such changes and modifications are, unless they depart from the true scope of the present invention, to be understood as included therein.

What is claimed is:

1. An electromagnetically driven device comprising:
a bobbin made of non-magnetic material and formed with an opening extending in its axial direction;
a plunger made of magnetic material and inserted into said opening of said bobbin for movement in its axial direction;
a permanent magnet having a first polarized surface polarized to one of the north and south poles and a second polarized surface polarized to the other of the north and south poles; said first polarized surface being attached to one end of said plunger and being in alignment with said second polarized surface in the axial direction of said plunger;
a segment made of magnetic material and having at least a first surface which is attached to said second polarized surface of said permanent magnet and a second surface which is polarized to the same polarity as said second polarized surface of said permanent magnet and which is always located outside said opening of said bobbin;
a coil wound around said bobbin so as to intersect the magnetic field of said permanent magnet produced at a space between the peripheral surface of the plunger and said second surface of said segment, said second surface of said segment being located closer to the side surface of the wound coil than said second polarized surface of said permanent magnet such that the space between said second surface of said segment and the peripheral surface of said plunger has a magnetic reluctance which is less than the magnetic reluctance of a space between said second polarized surface of said permanent magnet and the peripheral surface of said plunger if said segment were not attached to said second polarized surface of said permanent magnet by said first surface; and,
a current supply circuit for supplying an electric current to said coil.

2. An electromagnetically driven device comprising:
a bobbin made of non-magnetic material and formed with an opening extending in its axial direction;
a plunger made of magnetic material and inserted into said opening of said bobbin for movement in its axial direction;
a permanent magnet having a first polarized surface which is polarized to one of the north and south poles and which is attached to one end of said plunger, a second polarized surface which is polarized to the other of the north and south poles and which is out of alignment with said first polarized surface in the axial direction of said plunger, and a third non-polarized surface which is opposite to said first polarized surface in the axial direction of said plunger;
a coil wound around said bobbin so as to intersect the magnetic field produced at a space between said second polarized surface of said permanent magnet and the peripheral surface of said plunger, said second polarized surface of said permanent magnet being located closer to the peripheral surface of said wound coil than said third non-polarized surface of said permanent magnet such that the space between said second polarized surface of said permanent magnet and the peripheral surface of said plunger has a magnetic reluctance which is less than the magnetic reluctance of a space between said third non-polarized surface of said permanent magnet and the peripheral surface of said plunger if said third non-polarized surface of said permanent magnet were polarized, and
a current supply circuit for supplying an electric current to said coil.

3. An electromagnetically driven device as claimed in claim 1, wherein said plunger has a circular cross-sectional configuration and said permanent magnet has a disc shape with a diameter equal to that of the plunger.

4. An electromagnetically driven device as claimed in claim 3, wherein said segment comprises a disc having a pair of flat surfaces and a curved peripheral surface, one of said pair of flat surfaces of said disc being said first surface of said segment and said curved peripheral surface of said disc being said second surface of said segment.

5. An electromagnetically driven device as claimed in claim 4, wherein said segment has a diameter larger than that of the permanent magnet.

6. An electromagnetically driven device as claimed in claim 2, wherein said plunger has a circular cross-sectional configuration and said permanent magnet has a disc shape.

7. A electromagnetically driven device as claimed in claim 6, wherein said permanent magnet has a diameter larger than that of the plunger.

8. An electromagnetically driven device as claimed in claim 7, wherein said first polarized surface is located at a central portion of one flat surface of the disc shaped permanent magnet and said second polarized surface is located at a peripheral portion of the same flat surface of the disc shaped permanent magnet and wherein said third nonpolarized surface comprises another flat surface of said disc shaped permanent magnet opposite to said flat surface and in the axial direction of said plunger.

9. An electromagnetically driven device as claimed in claim 7, wherein said first polarized surface is located at a central portion of one flat surface of the disc shaped permanent magnet and said second polarized surface is located at a curved peripheral surface of the disc shaped permanent magnet and wherein said third non-polarized surface comprises another flat surface of said disc shaped permanent magnet opposite to said flat surface and in the axial direction of said plunger.

10. An electromagnetically driven device as claimed in claim 2, wherein said plunger has a circular cross-sectional configuration, and said permanent magnet has a disc shape with a reduced diameter projection integrally and coaxially formed on the disc.

11. An electromagnetically driven device as claimed in claim 10, wherein said first polarized surface is located at a central portion of an end surface of the reduced diameter projection and said second polarized surface is located at a peripheral portion of a surface of the disc having the reduced diameter projection.

12. An electromagnetically driven device as claimed in claim 10, wherein said first polarized surface is located at a central portion of an end surface of the diameter reduced projection and said second polarized surface is located at a curved peripheral surface of the disc.

13. An electromagnetically driven device as claimed in claim 6, wherein said first polarized surface is located at a central portion of one flat surface of said disc shaped permanent magnet, and said disc shaped permanent magnet has a part of its curved peripheral surface slanted so that its slanted part faces said coil, said second polarized surface being located at the slanted part.

* * * * *